(12) United States Patent
Frankenberger

(10) Patent No.: US 9,452,445 B2
(45) Date of Patent: Sep. 27, 2016

(54) METHOD FOR PRODUCING AN AIRCRAFT STRUCTURE COMPONENT HAVING AN OUTER SKIN PROVIDED WITH A SMOOTH OUTER SURFACE

(71) Applicant: Airbus Operations GmbH, Hamburg (DE)

(72) Inventor: Eckart Frankenberger, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/016,826

(22) Filed: Sep. 3, 2013

(65) Prior Publication Data

US 2014/0234530 A1    Aug. 21, 2014

Related U.S. Application Data

(60) Provisional application No. 61/696,621, filed on Sep. 4, 2012.

(30) Foreign Application Priority Data

Sep. 4, 2012  (EP) .................................... 12182910

(51) Int. Cl.
| | |
|---|---|
| *B05D 3/06* | (2006.01) |
| *B64C 21/10* | (2006.01) |
| *B22F 3/105* | (2006.01) |
| *B29C 67/00* | (2006.01) |
| *B64C 1/00* | (2006.01) |
| *B64C 3/26* | (2006.01) |

(52) U.S. Cl.
CPC ................ *B05D 3/06* (2013.01); *B22F 3/105* (2013.01); *B29C 67/0059* (2013.01); *B64C 1/00* (2013.01); *B64C 21/10* (2013.01); *B64C 3/26* (2013.01); *Y02T 50/166* (2013.01)

(58) Field of Classification Search
None
See application file for complete search history.

(56) References Cited

U.S. PATENT DOCUMENTS

| 4,225,372 A | * | 9/1980 | Kinzler et al. ................. 156/154 |
| 6,548,428 B1 | | 4/2003 | Lanitz et al. |
| 2006/0068109 A1 | * | 3/2006 | Frankenberger et al. ..... 427/256 |
| 2007/0107826 A1 | * | 5/2007 | Weisser .......................... 156/64 |
| 2009/0286002 A1 | * | 11/2009 | Iezzi et al. .................... 427/508 |

FOREIGN PATENT DOCUMENTS

| CN | 1138309 A | 12/1996 |
| EP | 1 586 676 | 10/2005 |
| GB | 2 379 414 | 3/2003 |

OTHER PUBLICATIONS

European Search Report for Application No. EP 12 18 2910 dated Jan. 24, 2013.
Chinese Office Action for Application No. 201310395876.6 dated May 5, 2015.

* cited by examiner

*Primary Examiner* — Michael P Rodriguez
(74) *Attorney, Agent, or Firm* — Jenkins, Wilson, Taylor & Hunt, P.A.

(57) ABSTRACT

A method for producing an aircraft structure component is disclosed the component having an outer skin provided with a smooth outer surface. The method includes providing an aircraft structure component having an outer skin including at least one recess, detecting the location of said at least one recess by a recess detecting device, and filling said at least one recess at the detected location with particles of a filling material, said particles of filling material being applied into said at least one recess by an ink jet printing device.

8 Claims, 4 Drawing Sheets

METHOD FOR PRODUCING AN AIRCRAFT STRUCTURE COMPONENT HAVING AN OUTER SKIN PROVIDED WITH A SMOOTH OUTER SURFACE

CROSS-REFERENCE TO RELATED APPLICATIONS

This application claims priority to and the benefit of European Patent Application No. EP 12182910.5 and to U.S. Provisional Application No. 61/696,621, both of which were filed on Sep. 4, 2012, the entire disclosures of which are both incorporated by reference herein.

TECHNICAL FIELD

The present invention relates to a method for producing an aircraft structure component having an outer skin provided with a smooth outer surface.

BACKGROUND

Even though fiber composite materials are already employed to a large extent in the construction of aircrafts, today many aircraft structure components are made of metallic material, such as aluminium, wherein separate parts of said aircraft structure components, such as the outer skin and the support structure elements, e.g. frames and stringers, are connected to one another by means of rivets, as rivet connections are reliable and considerably easy to establish between two metallic parts. However, such rivet connections usually involve the problem that during the process of riveting recesses are formed on the surface of the parts which are connected to one another, in particular in the outer surface of the outer skin, whereby a certain asperity is introduced into said surface. More detailed, said recesses are usually located adjacent to a rivet received in the outer skin, on that side of the rivet head which is opposite to the rivet shank, i.e. on that end of the rivet hole next to the outer skin's outer surface of the associated aircraft structure component.

Moreover, even when other types of connections such as welds are employed, these connections often result in a recess in the outer surface of the parts involved as well. Therefore, the present invention is not limited to the application to the region around rivet connections.

Such asperity in the outer skin's outer surface causes an unpleasant appearance of said outer surface, as due to said asperity a glimmer in the shape of a half moon is formed on the outer skin at the location of each recess which half moon becomes particularly visible after a reflecting layer of varnish has been applied to the surface.

Further, such asperity is disadvantageous in view of the flight characteristics of the respective aircraft, as the air circulating around said aircraft structure component is slightly vortexed and decelerated by said recesses, thereby slightly increasing the drag of said aircraft, said drag in turn causing the fuel consumption of the aircraft to increase and the maximum range to decrease.

For these reasons it is known in the art of aircraft construction to fill said recesses manually by means of a filling material and a spattle. Yet, such manual filling of the recesses is considerably time-consuming and expensive. Moreover, it is complicated to obtain proper results in that way.

SUMMARY

Therefore, it is the object of the present invention to provide a method for rapidly and conveniently producing an aircraft structure component having an outer skin provided with a considerably smooth and planar outer surface.

This object is achieved by a method for producing an aircraft structure component having an outer skin provided with a smooth outer surface, said method comprising the steps of:
a. providing an aircraft structure component having an outer skin including at least one recess,
b. detecting the location of said at least one recess by means of a recess detecting device, and
c. filling said at least one recess at the detected location with particles of a filling material, said particles of filling material being applied into said at least one recess by means of an ink jet printing device.

In such a manner each distinct recess in the outer skin of an aircraft structure component can be detected and specifically filled with particles of a filling material, such that no recess remains, but a smooth and planar outer surface of said aircraft structure component outer skin is established, thereby improving the outer appearance of said aircraft structure component, as well as the flight characteristics of the associated aircraft, in particular improving the circulation of air and reducing the drag. Said method may be carried out fast and properly and causes only reasonable costs.

Aircraft structure components within the meaning of the present invention may be any kind of aircraft structure component, in particular fuselages or fuselage sections, wings or wing sections, tail units, rudders, elevators, ailerons, high lift systems, engine cowls, or the similar, as well as parts of the afore-mentioned.

An ink jet printing device within the meaning of the present invention may be any kind of ink jet printing device, in particular a drop on demand ink jet printing device having a bubble jet print head, a piezo print head, or a pressure valve print head. Further, the operation of the ink jet printing device, in particular the operation and the positioning of the print head, may be controlled by a digital controlling device which is adapted to be programmed for controlling the print head to apply particles of the material in question onto the outer surface of the outer skin of the aircraft structure component in a predetermined pattern.

A recess within the meaning of the present invention may basically be any kind of asperity on the outer skin's outer surface of said aircraft structure component which deviates from the ideal shape in the direction towards the interior of said aircraft structure component, such as a buckling, a gap, or a crack, but preferably is a slight cavity in the outer skin in the area of the rivet head, caused by riveting said outer skin to another part of the aircraft structure component. However, the invention is not limited to the application to recesses formed in the surrounding of rivet connections.

The filling material may be any kind of solid or solidifying liquid material which is adapted to be applied in the form of particles adhering to said outer skin's outer surface and which may be brought into an integral stiff form. For example, the filling material may be a liquid resin the particles of which may be in the form of drops and which may adhere to the outer skin outer surface of the respective aircraft structure component and, subsequently, solidify. The filling material may also be a metal material the particles of which are applied onto the outer surface outer skin in solid condition. In order to join the particles of filling material to an integral form laser radiation may be applied to said particles by means of laser device. By laser radiation said particles may be laser sintered, i.e. the particles are melt by the heat is transferred to said particles by the laser radiation.

Through laser sintering of the particles of the filling material it may even be established an integral joint between said melt particles of filling material and the outer surface of the outer skin of said aircraft structure component.

The recess detecting device may be any device adapted to detect a certain geometrical shape or the deviation from a certain predetermined geometrical shape, including mechanical contact sensors, optical sensors, electromagnetic sensors, acoustical sensors, etc., operating in one, two, or three dimensions.

According to a preferred embodiment said at least one recess is located adjacent to a rivet received in the outer skin, on that side of the rivet head which is opposite to the rivet shank. Such recesses are formed during the process of riveting, where a rivet is inserted into a rivet hole extending through both of the parts of said aircraft structure component which are intended to be connected by said rivet, e.g. the outer skin and a stringer. The rivet head which is directed to the outer surface of the outer skin is usually lowered beneath the level of the outer skin's outer surface surrounding the respective rivet hole, so that it does not protrude beyond said outer surface and possibly becoming an unpleasant obstacle. Thus, between the outer surface of said lowered rivet head and the level in which the outer skin outer surface extends around said rivet hole a cavity or recess is formed, which is desired to be eliminated for the above listed reasons.

According to another preferred embodiment subsequent to detecting the location of said at least one recess the following steps are performed:
b.1 measuring the geometry of said at least one recess by means of a geometry measuring device, and
b.2 controlling the volume and position of particles of filling material to be filled inside said at least one recess in dependence of the measured geometry of said recess.

In such a manner the volume of each recess may be determined and the equivalent volume of particles of filling material may filled inside said recess by a position controlled ink jet printing device in order to form a smooth and planar outer surface of the filling material in the plane of the outer skin's outer surface extending around said recess without any remaining holes or protrusions extending beyond said plane. A very precise smooth outer surface may be formed in such a way.

The geometry of said recesses usually corresponds to a cylindrical or spherical cross section. The geometry measuring device may be formed similar to the recess detecting device and/or may be operatively coupled to said recess detecting device. However, both the geometry measuring device and the recess detection device may be operatively connected to a controlling device which controls the volume and position of the particles of filling material filled inside said recesses in dependence of the position of the recesses detected by said recess detecting device and the geometry of said recesses measure by said geometry measuring device.

In particular, it is preferred that the recess detecting device and the geometry measuring device are integrally formed as an optical distance measuring device. It is further preferred that the optical distance measuring device comprises a laser measuring device. Such laser measuring device may be a common laser measuring device adapted to precisely measure the geometry of a 3-dimensionally shaped body, e.g. an interferometry or triangulation laser distance measuring device. Said laser measuring device may be moved along the outer surface of the outer skin of the respective aircraft structure component, wherein it detects the recesses distributed in said outer skin's outer surface and measures the geometry of said recesses. Subsequently, i.e. "downstream" from said laser measuring device, the ink jet printing device is moved along said outer skin's outer surface, preferably along the same path the laser measuring device is moved, wherein it applies particles of said filling material into said recesses. In particular, it is conceivable that the detecting device, the measuring device and the ink jet printing device are mounted on a common support which is moved along the outer skin. The exact volume and position of the particles of filling material to be applied into said recesses is controlled by the controlling device in dependence of the position and geometry of said recesses measured by said laser measuring device.

In another preferred embodiment the filling material comprises a priming coat material. Said priming coat material may be any kind of priming material adapted to improve adhesion between an exterior varnishing and the plain outer surface of said aircraft component outer skin. Said priming coat material may preferably be the same priming material as it is used for the remaining aircraft structure component outer skin outer surface extending around said recesses. In such a manner the filling of said recesses and the application of a priming coat on the remaining outer surface of the respective aircraft structure component outer skin apart from the recesses may be carried out in one common step using only one common priming coat material, said common priming coat material may preferably be applied by means of the ink jet printing device used for the treatment of the recesses. Thereby, production time and costs may be considerably reduced.

In a further preferred embodiment subsequent to the step of filling said at least one recess said outer skin outer surface is coated with an additional coating layer. In particular, it is preferred that said additional coating layer is applied by means of said inkjet printing device. Said additional coating layer may be an exterior varnishing layer, i.e. the outermost layer of varnish the respective aircraft structure component outer skin outer surface is coated with. Said additional coating layer may be applied directly onto said layer of priming coat material. However, one or more intermediate layers may also be applied between said layer of priming coat material and said additional coating layer. Preferably, said additional coating layer as well as any possible intermediate layers are applied by means of an ink jet printing device, as in such a way only a sole coating device, namely said ink jet printing device, needs to be used for the entire coating process of the outer surface of the outer skin of said aircraft structure component.

BRIEF DESCRIPTION OF THE DRAWINGS

In the following an embodiment of the method according to the present invention is described by means of a drawing. Said drawing shows in FIG. 1 a flow diagram illustrating a preferred embodiment of the method for producing an aircraft structure component having an outer skin provided with a smooth outer surface, FIG. 2 a cross sectional view of an aircraft structure component known in the art illustrating recesses in the outer skin in the region of a rivet, FIG. 3 a cross sectional view of a laser measuring device and an ink jet printing device sensing and coating the outer surface of the outer skin of the aircraft structure component shown in FIG. 2, and FIG. 4 a cross sectional view of the aircraft structure component shown in FIG. 2, wherein a layer of priming coat material and an additional coating layer has been applied onto said outer skin's outer surface and into the recesses.

DETAILED DESCRIPTION

Figure 1:
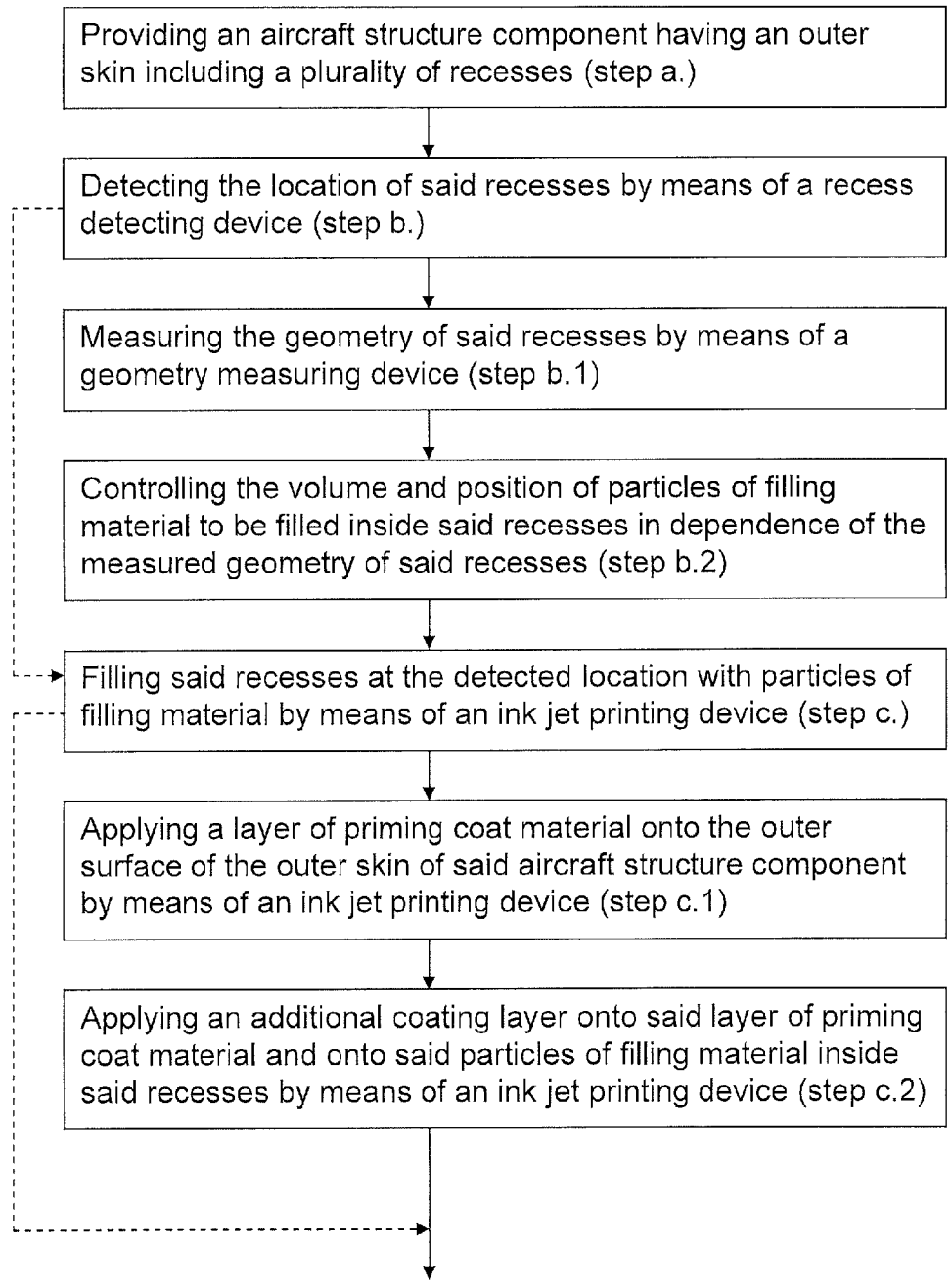

In FIG. 1 a flow diagram of a preferred embodiment of the method for producing an aircraft structure component 1 having an outer skin 3 provided with a smooth outer surface 5 according to the present invention is illustrated.

Figure 2:
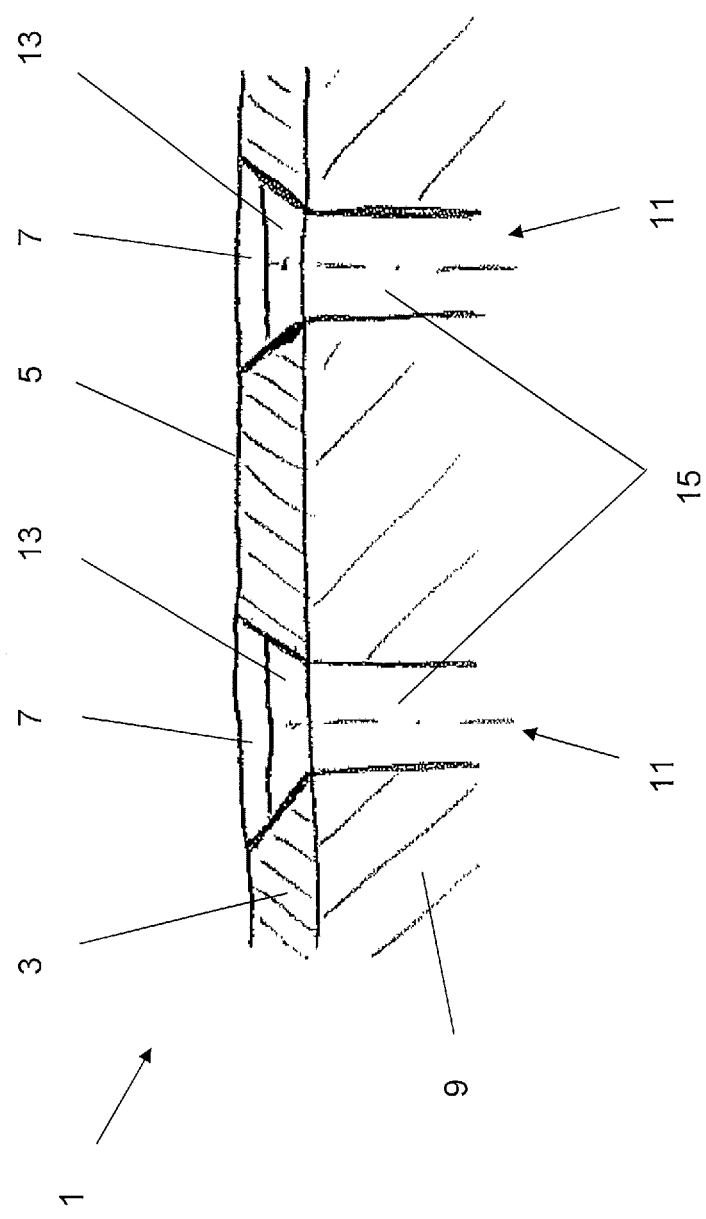

As a first step an aircraft structure component 1 is provided, said aircraft structure component 1 having an outer skin 3 including a plurality of recesses 7 (step a.). Such aircraft structure component 1 may basically be any kind of aircraft structure component 1, such as a fuselage or fuselage sections, a wing or wing sections, tail units, rudders, elevators, ailerons, high lift systems, engine cowls, or the like, as well as parts of the before mentioned, but in the present embodiment it is a fuselage section (see FIG. 2). Said fuselage section comprises an outer skin 3 having an outer surface 5 and a plurality of support structure elements 9, such as frames and stringers, onto which said outer skin 3 is mounted by means of a plurality of rivets 11. Said recesses 7 are introduced in the outer surface 5 of said outer skin 3 during the process of riveting, when the rivet heads 13 are lowered beneath the level of said outer skin 3 outer surface 5. Accordingly, said recesses 7 are located between said rivet heads 13 and said outer skin's 3 outer surface 5, i.e. adjacent to said rivets 11 received in the outer skin 3, on that side of the rivet heads 13 which is opposite to the corresponding rivet shanks 15, as it is illustrated in FIG. 2.

Figure 3:
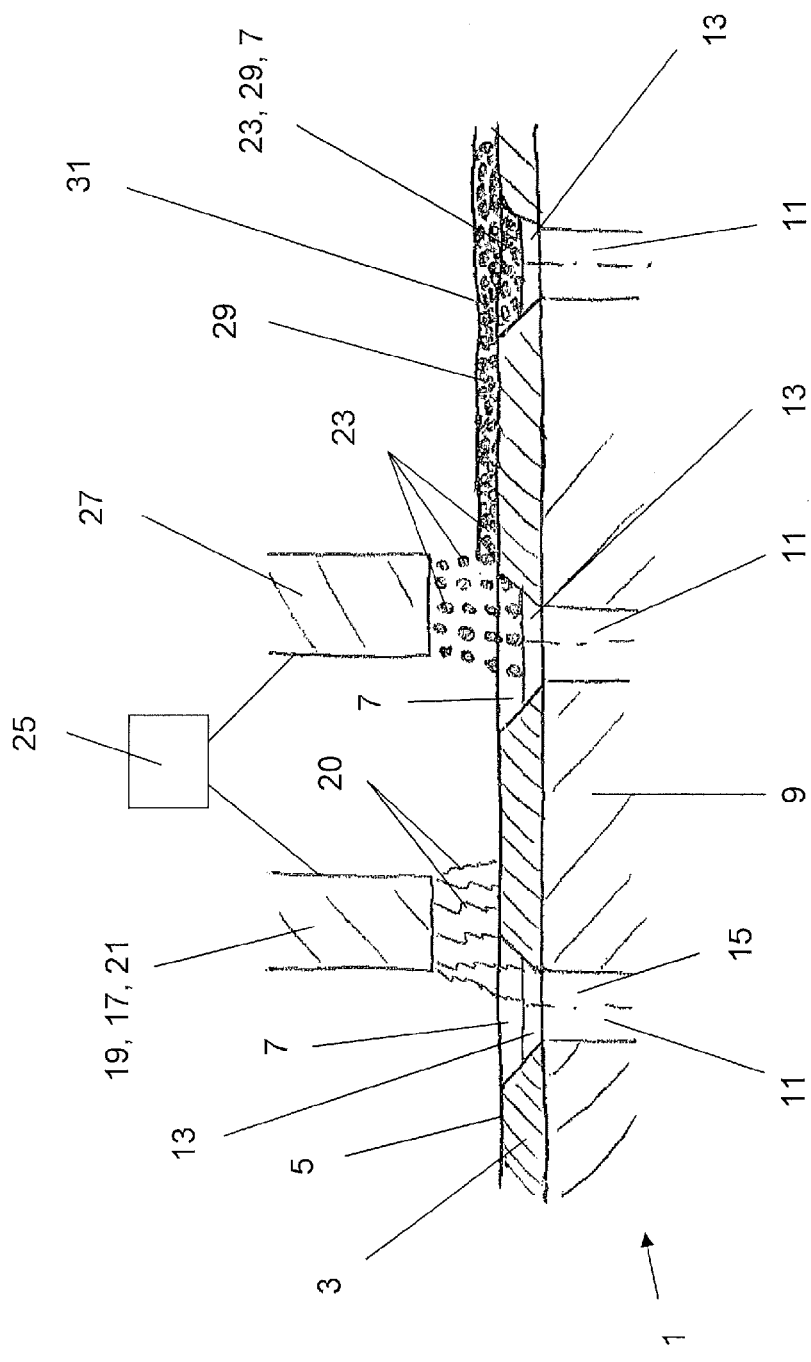

The second step involves detecting the location of said recesses 7 by means of a recess detecting device 17 (step b.). In the present embodiment the recess detecting device 17 comprises an optical distance measuring device, in particular a laser measuring device 19. As illustrated in FIG. 3, said laser measuring device 19 is moved along the outer surface 5 of the outer skin 3 of the respective aircraft structure component 1 in a predetermined constant distance to said outer surface 5 emitting laser radiation 20 to said outer surface 5, so that a change in said distance indicates the existence and position of a recess 7.

Further, the geometry of said recesses 7 is measured by means of a geometry measuring device 21 (step b.1). In the present embodiment said geometry measuring device 21 comprises an optical distance measuring device, in particular a laser measuring device 19, and is formed integrally together with the recess detecting device 17 (see FIG. 3). However, it is conceivable that only a recess detecting device is employed. Subsequently, the volume and position of particles of a filling material 23 to be filled into said recesses 7 are controlled in dependence of the measured geometry of said recesses 7 (step b.2). Therefore, a controlling device 25 is provided which is connected to the laser measuring device 19 and to an ink jet printing device 27 provided to fill said recesses 7 with particles of filling material 23, as illustrated in FIG. 3. The input parameters of said controlling device 25 correspond to the location and geometry of said recesses 7, wherein the output parameters of said controlling device 25 correspond to the volume and position of the particles of filling material 23 filled inside the respective recesses 7.

According to the next step said recesses 7 at the detected locations are filled with particles of filling material 23 by means of said ink jet printing device 27 (step c.). The filling material may be any kind of solid or solidifying liquid material which is adapted to be applied in the form of particles adhering to said outer skin 3 outer surface 5 and which may be brought into an integral stiff form, e.g. a resin, but in the present embodiment it is a priming coat material of the same kind as used for the layer of priming coat material 29 of the remaining outer surface 5 of the outer skin 3 around said recesses 7. The application of particles of filling material 23 by the ink jet printing device 27 is controlled, such that the recesses 7 are filled in such a way that a planar, smooth surface is formed in the plane of the outer skin 3 outer surface 5 surrounding said recesses 7.

In the present embodiment an ink jet printing device 27 may for example be a drop on demand ink jet printing device having a bubble jet print head, a piezo print head, or a pressure valve print head. Further, the operation of the ink jet printing device 27, in particular the operation and the positioning of the print head, may be controlled by the digital controlling device 25 which is adapted to be programmed for controlling the print head to apply particles of the material in question in a predetermined pattern.

The next step involves applying a layer of priming coat material 29 onto the outer surface 5 of the outer skin 3 of said aircraft structure component 1 by means of the ink jet printing device 27 (step c.1). Said priming coat material in the present embodiment is the same material as the filling material and is applied in the same form of particles 23 by the same ink jet printing device 27, i.e. in one common coating step (see FIG. 3). In such a way a common and continuous layer of priming coat material 29 may be provided over the entire outer skin 3 outer surface 5, having an exterior surface 31 directed towards the outside of said aircraft structure component 1 extending in one smooth plane parallel to the outer skin 3 outer surface 5.

Figure 4:
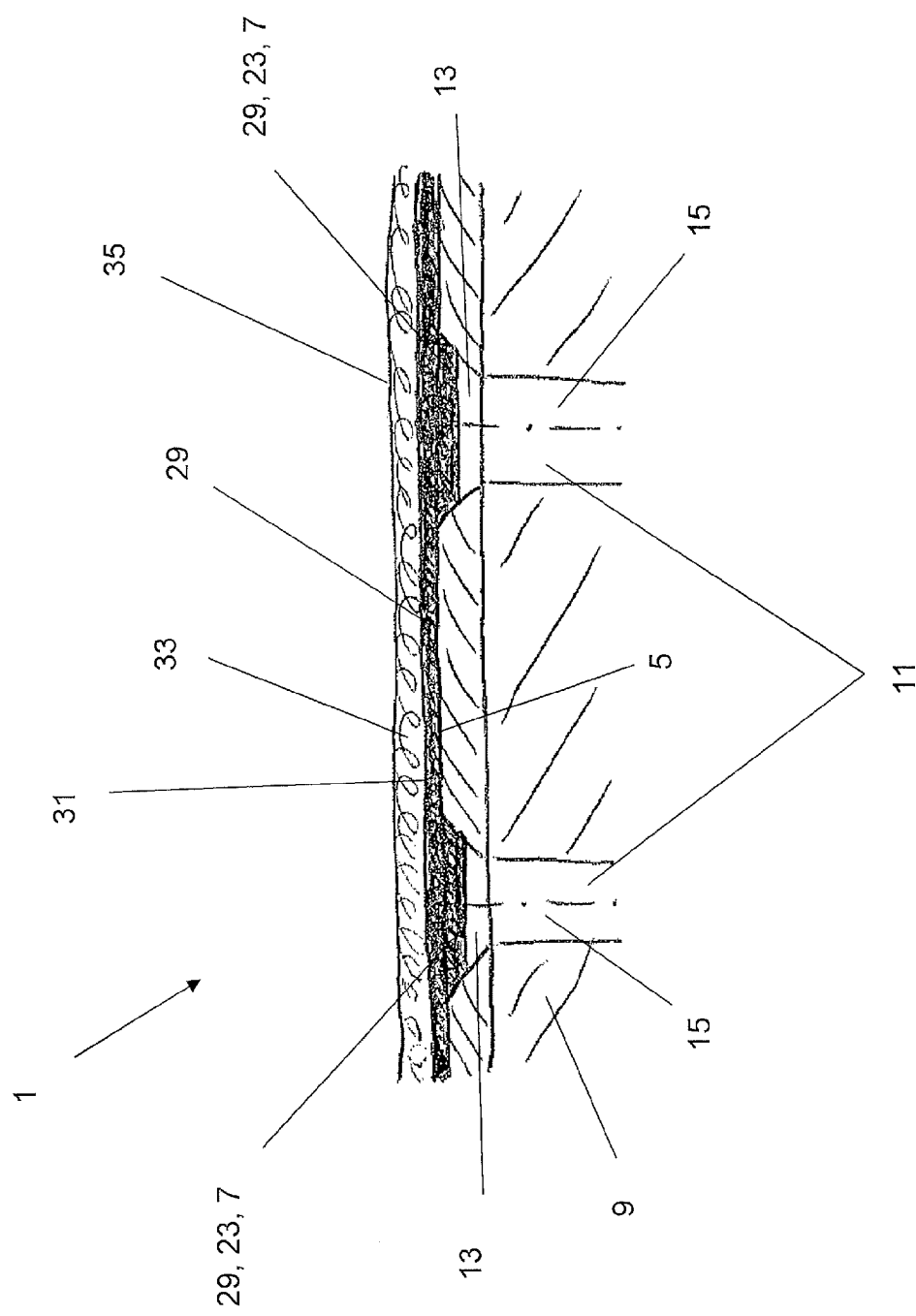

Subsequently, an additional coating layer 33 is applied onto said layer of priming coat material 29 and onto said particles of filling material 23 inside said recesses 7 by means of the ink jet printing device 27 (step c.2). The additional coating layer in the present embodiment comprises an exterior varnishing layer, i.e. the outermost layer on the outer skin 3 outer surface 5 of said aircraft structure component 1, as illustrated in FIG. 4. Intermediate layers between the layer of priming coat material 29 and the additional coating layer 33 are possible. The additional coating layer 33 may be applied by means of the same ink jet printing device 27 as used for applying the layer of priming coat material 29, but in a further coating step, or it is possible that it may be applied by means of a different ink jet printing device.

In summary an aircraft structure component 1 having an outer skin 3 provided with a smooth outer surface 5 is produced. Such aircraft structure component 1 may comprise an outer skin 3 connected to a support structure element 9 by means of rivets 11. On the outer surface 5 of said outer skin 3 a layer of priming coat material 29 is formed which extends also into the recesses 7 formed adjacent to the rivets 11 on that side of the rivet head 13 opposite to the rivet shank 15, and which towards the outside of said aircraft structure component 1 has a smooth exterior surface 31 parallel to the plane in which the outer skin's 3 outer surface 5 extends around said recesses 7. On top of said layer of priming coat material 29 an additional coating layer 33, in particular an exterior varnishing layer, is formed the outermost surface 35 of which also extends parallel to the outer skin 3 outer surface 5 surrounding said recesses 5.

By means of such a coating of the outer surface 5 of the outer skin 3 of said aircraft structure component 1, in particular said fuselage section, no half moon shaped glimmer appears on the exterior varnishing layer at the location of the rivets 11, thereby causing an unpleasant appearance of said aircraft structure component 1, as well as the flight characteristics, in particular the air circulation around said aircraft structure component 1 may be improved.

The invention claimed is:

1. A method for producing an aircraft structure component having an outer skin provided with an aerodynamic outer surface, the method comprising:
    providing the aircraft structure component having the outer skin with the aerodynamic outer surface, wherein the aerodynamic outer surface of the outer skin includes at least one recess disposed therein;
    detecting a location of the at least one recess disposed in the aerodynamic outer surface of the outer skin by a recess detecting device;
    filling the at least one recess at the detected location on the aerodynamic outer surface of the outer skin with particles of a filling material, wherein the filling material comprises metal, and wherein the particles of the filling material are applied into the at least one recess by an ink jet printing device; and
    sintering, via a laser, the filling material disposed in the at least one recess for joining the particles of the filling material.

2. The method according to claim 1, wherein the at least one recess is located adjacent to a rivet received in the aerodynamic outer surface of the outer skin, on a side of a head of the rivet which is opposite to a shank of the rivet.

3. The method according to claim 1, further comprising, subsequent to detecting the location of the at least one recess:
    measuring a geometry of the at least one recess by a geometry measuring device; and
    controlling a volume and position of the particles of the filling material to be filled inside the at least one recess depending on the measured geometry of the recess.

4. The method according to claim 3, wherein the recess detecting device and the geometry measuring device are integrally formed as an optical distance measuring device.

5. The method according to claim 4, wherein the optical distance measuring device comprises a laser measuring device.

6. The method according to claim 1, wherein the filling material comprises a priming coat material.

7. The method according to claim 1, wherein subsequent to filling the at least one recess the aerodynamic outer surface of the outer skin is coated with an additional coating layer.

8. The method according to claim 7, wherein the additional coating layer is applied by the inkjet printing device.

* * * * *